US009099911B2

(12) United States Patent
Liu et al.

(10) Patent No.: US 9,099,911 B2
(45) Date of Patent: Aug. 4, 2015

(54) UNIVERSAL MOTOR

(75) Inventors: Bao Ting Liu, Shenzhen (CN); Ji Cheng Pan, Shenzhen (CN); Xu Hai Wei, Shenzhen (CN)

(73) Assignee: Johnson Electric S.A., Murten (CH)

( * ) Notice: Subject to any disclaimer, the term of this patent is extended or adjusted under 35 U.S.C. 154(b) by 523 days.

(21) Appl. No.: 13/196,107

(22) Filed: Aug. 2, 2011

(65) Prior Publication Data

US 2012/0025656 A1 Feb. 2, 2012

(30) Foreign Application Priority Data

Aug. 2, 2010 (CN) .......................... 2010 1 0250329

(51) Int. Cl.
H02K 23/64 (2006.01)
H02K 23/40 (2006.01)

(52) U.S. Cl.
CPC ............... *H02K 23/40* (2013.01); *H02K 23/64* (2013.01); *H02K 2213/03* (2013.01)

(58) Field of Classification Search
CPC ............................... H02K 23/40; H02K 23/64
USPC ......................................... 310/158, 216, 269
IPC ......................................................... H02K 23/63
See application file for complete search history.

(56) References Cited

U.S. PATENT DOCUMENTS

| | | | |
|---|---|---|---|
| 5,087,845 A * | 2/1992 | Behrens et al. .................. 310/77 |
| 5,959,387 A * | 9/1999 | Mowery et al. ............... 310/198 |
| 6,198,195 B1 * | 3/2001 | Embree et al. ............. 310/254.1 |
| 8,680,738 B2 * | 3/2014 | Liu et al. ................. 310/216.071 |
| 8,749,106 B2 * | 6/2014 | Liu et al. ......................... 310/198 |
| 8,766,504 B2 * | 7/2014 | Liu et al. ......................... 310/198 |
| 8,911,221 B2 * | 12/2014 | Cheng et al. ................ 417/423.7 |
| 2005/0057113 A1 * | 3/2005 | Du et al. .......................... 310/218 |
| 2006/0226729 A1 * | 10/2006 | Du et al. .......................... 310/218 |
| 2007/0126310 A1 * | 6/2007 | Tang et al. ....................... 310/216 |
| 2007/0247014 A1 * | 10/2007 | Schach et al. ................... 310/184 |
| 2009/0021090 A1 * | 1/2009 | Du et al. ........................... 310/50 |
| 2010/0156229 A1 * | 6/2010 | Liu et al. ......................... 310/158 |
| 2011/0283896 A1 * | 11/2011 | Lam et al. ........................ 99/485 |
| 2012/0025656 A1 * | 2/2012 | Liu et al. ......................... 310/158 |

* cited by examiner

*Primary Examiner* — John K Kim
(74) *Attorney, Agent, or Firm* — Muncy, Geissler, Olds & Lowe, P.C.

(57) ABSTRACT

A universal motor includes a wound rotor and a stator. The stator has stator windings and a stator code. The stator core has at least two poles with the stator windings wound thereon and a yoke connecting the poles. Each pole has a neck and a pole shoe forming a continuous pole arc facing the rotor. The ratio of the diameter of the motor to the width of the stator core measured across the poles is between 0.65~0.95.

5 Claims, 1 Drawing Sheet

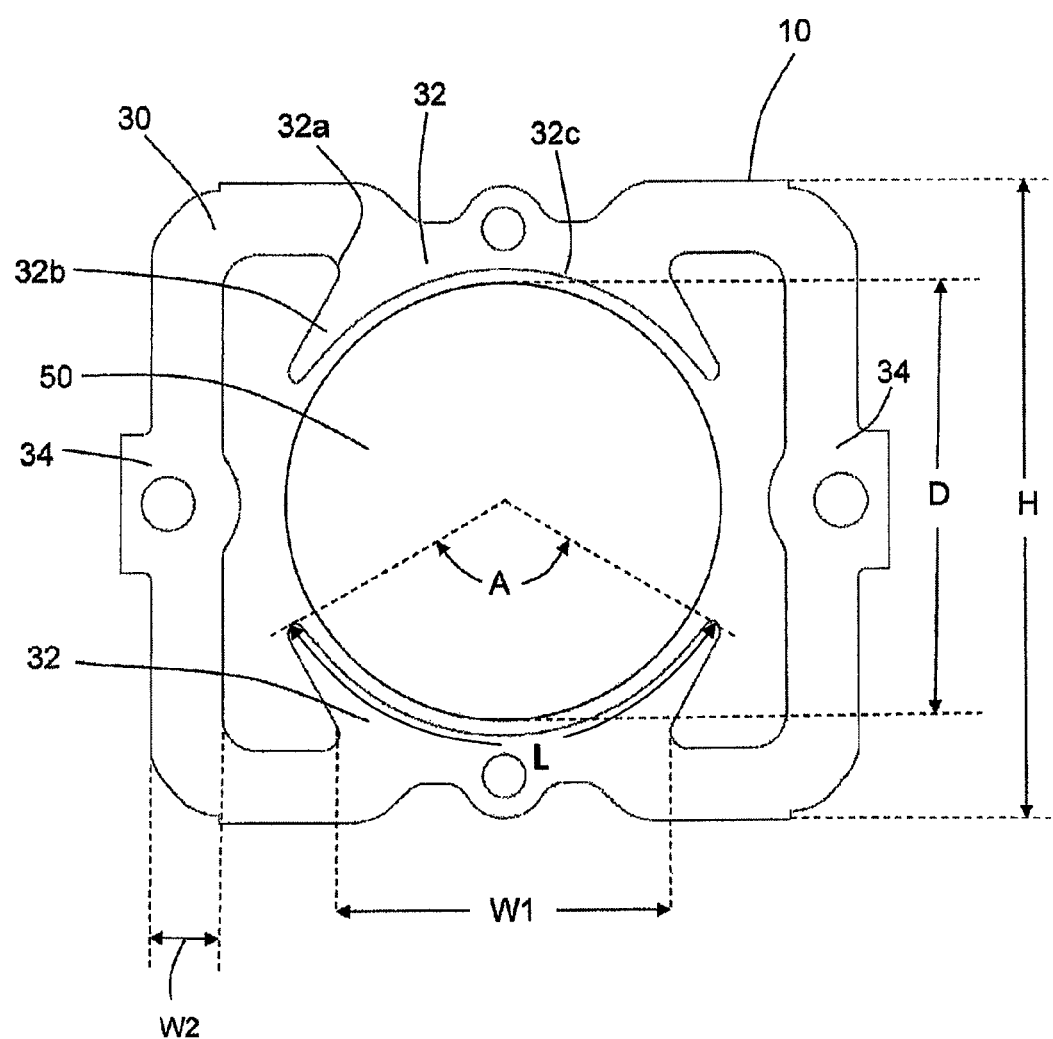

UNIVERSAL MOTOR

CROSS REFERENCE TO RELATED APPLICATIONS

This non-provisional patent application claims priority under 35 U.S.C. §119(a) from Patent Application No. 201010250329.5 filed in The People's Republic of China on Aug. 2, 2010.

FIELD OF THE INVENTION

This invention relates to a universal motor and in particular, to a stator of a universal motor.

BACKGROUND OF THE INVENTION

A single phase series motor is also known as a universal motor as it can operate on either AC or DC power. The single phase series motor is a single phase motor in which the rotor windings are electrically connected in series with the stator windings. Due to its characteristics of high rotating speed, small size, high starting torque, convenient speed regulation and series excitation, the universal motor is commonly used for driving low power appliances that need a high rotating speed, small size and low weight, such as medical devices, power tools and domestic electric appliances and so on. There is a strong desire for these appliances to be smaller and lighter. To satisfy that desire the motor must be smaller and lighter.

The present invention aims to provide a universal motor with a new stator structure to meet the above desire.

SUMMARY OF THE INVENTION

Accordingly, in one aspect thereof, the present invention provides a universal motor comprising a wound rotor and a stator, the stator comprising stator windings and a stator core having at least two poles with the stator windings wound thereon and a yoke connecting the poles, each pole has a neck and a pole shoe which forms a continuous pole arc facing the rotor; wherein the ratio of the diameter D of the rotor to the dimension H of the stator core measured in the height direction of the neck is between 0.65~0.95.

Preferably, the ratio of the diameter D of the rotor to the dimension H of the stator core in the height direction of the neck is between 0.7~0.72.

Preferably, the ratio of the width W1 of the neck to the diameter D of the rotor is between 0.65~0.85.

Preferably, the ratio of the difference between the arc length of the pole arc and the width W1 of the neck, to the width W1 of the neck is less than or equal to 0.25.

Preferably, the ratio of the width W2 of the yoke to the diameter D of the rotor is between 0.15~0.25.

Preferably, the ratio of the width W2 of the yoke to the width W1 of the neck is between 0.15~0.25.

Preferably, the angular extent of the pole arc is between 118 to 122 degrees.

A second aspect of the present invention provides a home appliance incorporating a universal motor as described above.

BRIEF DESCRIPTION OF THE DRAWINGS

A preferred embodiment of the invention will now be described, by way of example only, with reference to the single FIGURE of the accompanying drawings. Dimensions of components and features shown in the FIGURE are generally chosen for convenience and clarity of presentation and are not necessarily shown to scale.

FIG. 1 is a schematic partial view of a universal motor in accordance with the preferred embodiment of the present invention.

DETAILED DESCRIPTION OF THE PREFERRED EMBODIMENTS

A universal motor in accordance with the preferred embodiment of the present invention comprises a stator 10 and a rotor 50 installed in the stator 10. The stator 10 has a stator core 30 and stator windings (not shown). FIG. 1 shows only the stator core 30 and the rotor 50. The stator core 30 is formed by stacking laminations in the axial direction of the motor. The stator core 30 has two salient poles 32 on which the stator windings are wound and a yoke 34 connecting the two poles 32 at two sides. Each salient pole 32 comprises a neck 32a and a pole shoe 32b extending circumferentially from the neck 32a. Each pole shoe 32b forms a continuous pole arc 32c facing the rotor 50. In the embodiment, the ratio of the diameter D of the rotor 50 to the dimension H of the stator 10 (the diameter of the stator measured from an upper end of the stator core to a lower end of the stator core, that is measured across the poles 32) is between 0.65~0.95, and preferably is between 0.7~0.72.

Preferably, the ratio of the width W1 of the neck 32a to the diameter D of the rotor 50 is between 0.65~0.85.

Preferably, the ratio of the difference between the arc length L of the pole arc 32c and the width W1 of the neck 32a to the width W1 of the neck is less than or equal to 0.25. That is, $|L-W1|/W1 \leq 0.25$.

Preferably, the ratio of the width W2 of the stator yoke 34 to the diameter D of the rotor 50 is between 0.15~0.25.

Preferably, the ratio of the width W2 of the stator yoke 34 to the width W1 of the neck 32a is between 0.15~0.25.

The angular extent of the pole arc is defined as angle A shown in FIG. 1. Preferably, the angular extent of the pole arc is between 118 & 122 degrees.

The universal motor is particularly suitable for small home appliances like hair dryers.

In embodiments of the present invention, the height of the neck is reduced and the width of the neck is increased, so that the dimension H of the stator measured across the necks is decreased, which results in a decrease in the cross sectional area of the stator core and an increase in the power density of the motor. Secondly, the length of magnetic path of the motor is decreased due to the increase in the width W1 of the neck and the magnetic density of the yoke is decreased due to an increase in the width W2 of the stator yoke, therefore the excitation magneto motive force of motor, the material cost and the weight of the motor are decreased. Thirdly, the process of winding the stator windings is improved due to the increase in the width of the neck.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A universal motor comprising a wound rotor and a stator, the stator comprising stator windings and a stator core having at least two poles with the stator windings wound thereon and a yoke connecting the poles, the stator core having a first end and a second end opposite to each other, the at least two poles comprising a first pole protruding inwardly from the first end and a second pole protruding inwardly from the second end, each pole has a neck adjoining the yoke and a pole shoe which extends from the neck and forms a continuous pole arc facing the rotor; wherein the ratio of the diameter D of the rotor to the dimension H of the stator core measured from the first end of the stator core to the second end of the stator core is substantially 0.65, wherein for each pole, there is a difference value between the arc length L of the pole arc and the width W1 of the neck, and the ratio of the difference value L−W1 to the width W1 of the neck is less than or equal to 0.25.

2. The universal motor of claim 1, wherein the ratio of the width W1 of the neck to the diameter D of the rotor is between 0.65~0.85.

3. The universal motor of claim 1, wherein the ratio of the width W2 of the yoke to the diameter D of the rotor is between 0.15~0.25.

4. The universal motor of claim 1, wherein the ratio of the width W2 of the yoke to the width W1 of the neck is between 0.15~0.25.

5. The universal motor of claim 1, wherein the angular extent of the pole arc is between 118 to 122 degrees.

\* \* \* \* \*